(12) United States Patent
Allert et al.

(10) Patent No.: US 11,515,724 B1
(45) Date of Patent: Nov. 29, 2022

(54) ELECTRICAL UNIT AND BACKUP POWER SYSTEM

(71) Applicant: SMA Solar Technology AG, Niestetal (DE)

(72) Inventors: Claus Allert, Kaufungen (DE); Aleksandra-Sasa Bukvic-Schaefer, Kassel (DE); Harald Christian Benz, Flensburg (DE); Patrick Blair Reynolds, Charlotte, NC (US)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 17/322,095

(22) Filed: May 17, 2021

(51) Int. Cl.
| | | |
|---|---|---|
| *H02J 7/00* | (2006.01) | |
| *H02J 9/00* | (2006.01) | |
| *H02J 9/06* | (2006.01) | |
| *H02J 3/38* | (2006.01) | |

(52) U.S. Cl.
CPC .............. *H02J 9/062* (2013.01); *H02J 3/381* (2013.01); *H02J 2300/24* (2020.01)

(58) Field of Classification Search
CPC ......... H02J 9/062; H02J 3/381; H02J 2300/02
See application file for complete search history.

(56) References Cited

U.S. PATENT DOCUMENTS

| 2012/0175955 | A1* | 7/2012 | Carralero | H02J 9/062 |
| | | | | 307/65 |
| 2018/0131226 | A1* | 5/2018 | Narla | H02J 7/35 |
| 2019/0140453 | A1* | 5/2019 | Yi | H02J 3/38 |
| 2019/0207391 | A1* | 7/2019 | Fazeli | H02J 3/381 |
| 2019/0341781 | A1* | 11/2019 | Marchegiani | H02J 3/38 |
| 2021/0083506 | A1* | 3/2021 | Rao | H02J 13/00002 |
| 2021/0152077 | A1* | 5/2021 | Strandberg | H02M 1/126 |

\* cited by examiner

*Primary Examiner* — Toan T Vu (74) *Attorney, Agent, or Firm* — Eschweiler & Potashnik, LLC (57) ABSTRACT

Disclosed is an electrical unit with a first port configured to be operatively connected to an AC-grid, a second port configured to be operatively connected to an AC-load, and a third port to be operatively connected to an AC-side of a first inverter. The electrical unit includes a first choke arranged between the third port and the second port. The electrical unit is configured to transfer electrical power provided by the first inverter from the third port via the first choke to the second port. The electrical unit is configured to provide grid-forming electrical power to the second port in case of disconnection from the AC-grid at the first port. Further disclosed is a backup power system and a method for operating a backup power system.

18 Claims, 3 Drawing Sheets

ELECTRICAL UNIT AND BACKUP POWER SYSTEM

FIELD

The disclosure is related to the technical field of electrical power supply and a backup power supply.

BACKGROUND

Backup power systems are intended to provide electrical power to a load during disconnection from an alternating current AC-grid, e.g., during an AC-grid outage. Backup power systems may rely on electrical energy storage providing direct current DC power, e.g. batteries. It is further known to use inverters for transforming direct current DC electrical energy from such energy storage to AC backup power suitable for replacing the grid-based AC power from the AC-grid in case of an AC-grid outage.

SUMMARY

Backup power systems may comprise one or more inverters, to each of which a plurality of storages like batteries may be connected to form a DC-coupled energy storage. The inverters may be AC-coupled with each other to provide backup power to a common AC-load. The AC-load may be selectively connected to the AC-grid and/or to one or more inverters by means of an electrical unit comprising ports for connection to the inverters, the AC-grid and the AC-load.

Disclosed is an electrical unit with a first port configured to be operatively connected to an AC-grid, a second port configured to be operatively connected to an AC-load, and a third port to be operatively connected to an AC-side of a first inverter. The electrical unit comprises a first choke arranged between the third port and the second port. The electrical unit is configured to transfer electrical power provided by the first inverter from the third port via the first choke to the second port, and to selectively provide grid-based electrical power from the AC-grid via the first port and the second port or grid forming electrical power via the third port and the second port to the AC-load. The electrical unit further comprises a switch for disconnection of the electrical unit from the AC-grid, wherein the switch is arranged at or associated with the first port.

The AC-grid may, for example, be a power supply network like a utility grid. Grid-based electrical power is electrical power supplied by the AC-grid, wherein the voltage of the AC-grid is basically set by the AC-grid itself and virtually not affected by the operation of the load. Grid-forming electrical power, on the other hand, is electrical power that is provided according to an actual AC-load, e.g., in an islanded microgrid, and controlled dynamically, in order to actively form and stabilize the voltage at the AC-load. A source providing grid-forming electrical power hence can be understood to act as a voltage source.

The electrical unit may serve as a switching cabinet that contains switches to connect or disconnect the first port to the second port or the third port to the second port. The ports may comprise contactors and other electrical means, e.g., fuses for protection or voltage or current sensors for measurements. The electrical unit comprises the first choke which serves as a decoupling choke or decoupling inductance for the first inverter, which is configured to provide grid-forming power when being operated in a grid-forming mode. The first inverter may also be configured to operate in parallel with the AC-grid in a grid following mode, in which an AC-load connected to the second port is powered by the AC-grid and the first inverter in parallel, wherein the first inverter provides grid-following currents which may be fed-in to the AC-load and/or the AC-grid as far as the latter is available. The first inverter may comprise a first control unit, e. g. firmware, with a control strategy allowing the parallel operation of the first inverter with the AC-grid. The control strategy includes the first inverter and the first choke and is configured to control the power provided to the AC-load via the second port.

While the first port of the electrical unit is connected to the AC-grid, grid-based electrical power may be provided to the AC-load via the first port and the second port. Additionally, grid-following electrical power may be provided from the first inverter to the AC-load and/or to the AC-grid via the third port, the second port and/or the first port, respectively. Grid-following electrical power is provided such that the current generated by the first inverter follows the given course of the voltage of the AC-grid. The first inverter providing grid-following electrical power hence can be understood to act as a current source.

In an embodiment, the electrical unit further comprises a fourth port to be operatively connected to an AC-side of a second inverter, and a second choke arranged between the fourth port and the second port of the electrical unit. The electrical unit is configured to transfer electrical power provided by the second inverter at the fourth port via the second choke and the second port to the AC-load. The first choke and the second choke are configured to decouple the third and fourth port, respectively, such that a control strategy for parallel operation of the first and second inverters may comprise a power balancing mechanism. For example, a droop control taking the first and second choke into account may be configured within the first and second inverters to provide grid-forming electrical power in a manner that is coordinated between the first and second inverters when the first and second inverters operate in grid-forming mode autonomously to supply the AC-load exclusively, i.e., in the absence of an AC-grid providing a reference voltage course.

The electrical unit may therefore allow for one or more inverters that are actually intended for grid parallel operation only, to be operated as grid-forming inverters in parallel and to provide grid-forming electrical power in a coordinated manner even if the inverters are operated autonomously. The electrical unit may be used to connect the first and second inverter in parallel to the AC-load, and renders the first and second inverters suitable for operating in parallel to each other in grid forming mode, to supply the AC-load exclusively, e.g. without having the AC-grid available.

The electrical unit may be arranged between one or more inverters and one or more loads to be supplied during backup operation of a load grid. In particular, the electrical unit enables the use of two or more inverters in parallel to power a local grid in island operation. The electrical unit comprises a first choke and a second choke, which serve as decoupling chokes or decoupling inductances for the first inverter and second inverter, respectively. The first inverter and second inverter are configured to provide grid-forming power when being operatively connected to the first choke and second choke, respectively. The first inverter and/or second inverter may also be configured to operate in parallel with the AC-grid in a grid-following mode, in which a local grid connected to the second port is powered mainly by the AC-grid and supplemented by grid-following power provided by the first inverter and/or second inverter in parallel. The first inverter and/or second inverter may comprise a control unit, e. g. a dedicated firmware, with a control strategy allowing the parallel operation of the first inverter and/or the second inverter in grid-forming mode to supply the AC-load in case of a failure of the AC-grid. The control strategy includes the first inverter and the first choke as well as the second inverter and the second choke, and controls the power provided to the second port. The control strategy may allow the parallel, yet autonomous operation of the first inverter and second inverter in grid-forming mode with load sharing capabilities, resulting in a balance of power drawn from the first inverter and second inverter. The load sharing capabilities may, for example, comprise a so-called self-sync mechanism, for example using Power-Frequency (P/f) and Reactive Power Voltage (Q/V) droop characteristics.

In an embodiment, the electrical unit may comprise additional ports operatively connectable to additional inverters. There may or may not be chokes arranged between these additional ports and the second port. The ports without chokes associated thereto may be used to be operatively connected to inverters, which provide power in grid-following mode only, even when the system operates in island mode.

In an embodiment, the first choke, the second choke and/or any additional chokes may be arranged in one housing. In an embodiment, the first choke, the second choke and/or any additional chokes each may be arranged in separate housings. In an embodiment, some of the chokes may be arranged in one housing and others each in separate housings.

The electrical unit may be configured to transfer 1-phase or 3-phase power as well as split-phase power. It may supply 1-phase or 3-phase power as well as split-phase power at the second port. In the case of 1-phase and 3-phase power, one choke per phase may be foreseen. In split-phase systems, single phase inverters operating line to line and using an autoformer to generate the neutral between the phases may be used. Here, one single phase inverter may be connected to one port of the electrical unit, and the electrical unit may comprise one choke per phase.

In an embodiment, the electrical unit is configured to provide three-phase power to the second port, wherein the first choke and the second choke each comprise a common core with separate windings for each phase of the three-phase output, respectively. In this embodiment, the 3-phase chokes are configured to enable provision of 3-phase grid-forming power from the inverters to a three-phase AC-load.

In an embodiment of the electrical unit, the third port and/or the fourth port are further coupled to a central control unit associated with the electrical unit. Such central control unit may allow to execute common control functions regarding the parallel operation of the inverters in grid-forming or grid-following mode by providing adequate resources, e. g., computing power, data storage etc. In an embodiment, this allows to configure the inverters in a lean and cost-effective way. For example, the central control unit may execute a method for an overlaying control of the power system, e.g., for stationary stability. The central control unit may be comprised in the electrical unit, be a separate device or be part of one of the inverters.

In an embodiment of the electrical unit, the electrical unit comprises the control unit, which is configured to send control signals to the inverters via the third port and/or the fourth port. Such control signals may be sent to the inverters via communication channels associated with the third and/or the fourth port, wherein the communication channels may comprise one of a powerline communication channel, a combined terminal for a control signal line and an electrical power line, or a fixed assignment of a wired or wireless control signal terminal to a respective port by electrical means, e.g. by firmware.

In an embodiment of the electrical unit, a central control unit of the electrical unit is configured to determine a failure or loss of the AC-grid and to disconnect the AC-load from the AC-grid in case of a failure or loss of the AC-grid. This allows to provide backup electrical power to the load effectively and consistently without having to rely on an islanding detection mechanism in the inverters.

Disclosed is a backup power system comprising an electrical unit and a first inverter, wherein the first inverter is configured to transform electrical power between a DC-side of the first inverter and an AC-side of the first inverter, and wherein the AC-side of the first inverter is operatively connected to the third port of the electrical unit.

For the power transformation, the first inverter may, e.g., comprise an inverter bridge with switching elements which may be controlled by a first control unit, e. g. a firmware, of the first inverter. The DC-side of the first inverter may be connected to a DC power source, like a photovoltaic array (PV array) or a rechargeable DC-power storage, e.g., a battery or the like.

The first inverter may be configured to operate in grid-following mode only when operated in a stand-alone fashion, wherein connecting such inverter to the electrical unit renders the first inverter suitable for operating in grid-forming mode by facilitating the first choke during control of the inverter in grid-forming mode.

In an embodiment of the backup power system, the first inverter comprises a first control unit, wherein the first control unit is configured to control a first control loop comprising the first inverter and the first choke to selectively provide grid-following electrical power via the first port to the AC-grid and via the second port to the AC-load, or grid-forming electrical power via the second port to the AC-load if the AC-grid is disconnected.

Disclosed is a backup power system comprising an electrical unit and a first inverter, wherein the first inverter is configured to transform electrical power between a DC-side of the first inverter and an AC-side of the first inverter, and wherein the AC-side of the first inverter is operatively connected to the third port of the electrical unit. The backup power system further comprises a second inverter, wherein the second inverter is configured to transform electrical power between a DC-side of the second inverter and an AC-side of the second inverter, and wherein the AC-side of the second inverter is operatively connected to the fourth port of the electrical unit.

In an embodiment of the backup power system, the first choke and the second choke each have an inductance value which exceeds the inductance value of any inductance arranged at the AC-sides of the first inverter and the second inverter, respectively. Typical inverters intended for grid parallel operation usually do not have integrated high inductances, because for feeding power into the AC-grid in grid-following mode some small filter chokes are sufficient, e.g., for satisfying electromagnetic interference regulations, if any chokes are needed at all. Hence properly sized first and second chokes in the electrical unit enable facilitating such conventional grid-following inverters to operate in grid-forming mode in addition to grid parallel operation. The minimum inductance values of the first choke and the second choke may additionally depend on the switching frequency of the first inverter and second inverter, or vice versa, the actual inductance values of the first choke and the second choke may set a minimum switching frequency of the of the first inverter and second inverter in order to ensure stable grid-forming operation of the respective control loops.

In an embodiment of the backup power system, the first inverter comprises a first control unit, wherein the first control unit is configured to control a first control loop comprising the first inverter and the first choke, and the second inverter comprises a second control unit, wherein the second control unit is configured to control a second control loop comprising the second inverter and the second choke The first control unit and the second control unit are configured to individually control the respective control loops to selectively provide grid-following electrical power if the AC-load is connected to the AC-grid, or grid-forming electrical power if the AC-grid is disconnected.

In an embodiment of the backup power system, the first control loop and the second control loop are configured to share the electrical power supplied to the AC-load when the first and second inverters operate in grid-forming mode in case of a disconnection of the AC-grid.

In an embodiment of the backup power system, the first control loop and the second control loop are configured according to a self-sync method. In the configuration according to the self-sync method, the control units of the inverters comprise droop characteristics for inverter output frequency as a function of inverter output power and for inverter output voltage as a function of inverter output reactive power and vice versa.

In an embodiment, the backup power system comprises a central control unit configured to send control signals to the first inverter and the second inverter. This allows for realizing an overlaying control scheme e.g., executed by the central control unit, and comprises communicating control signals to the first control unit and the second control unit of the first inverter and second inverter, respectively. Such communication may be very helpful for ensuring stability of the stationary behavior of the backup power system, e.g., by manipulating certain droop parameters associated with the respective control loops as a function of parameters of the AC-load as captured by the central control unit. Furthermore, a communication of control signals as part of an overlaying control scheme may aid to bring the system's voltage and frequency back to nominal values. For example, during operation in grid-forming mode, the droop characteristics will tend to drive the system to a stable operating point while the system is loaded, and the control signals issued by the central control unit may drive the stable operating point to an operating point comprising nominal voltage and frequency in the system. The timing of such an overlaying control scheme may be slower than the timing of the power control loop controlled by the control units of the individual inverters. The clock time of such an overlaying control scheme may, e.g., be in the range of some 100 milliseconds compared to the microseconds clocking of the inverter control loop.

In an embodiment, the central control unit is configured to determine a failure or loss of the AC-grid and to disconnect the electrical unit from the AC-grid in case of a failure or loss of the AC-grid.

In an embodiment, the central control unit is configured to switch the control loops of the first inverter and the second inverter between a grid-following operation mode and the grid-forming operation mode based on the determination of whether the AC-grid is available or not, respectively. The AC-grid may, for example, not be available if there is a failure of the AC-grid.

Since the electrical unit provides the chokes needed to decouple the third and fourth port, it is possible to operate the inverters connected to the electrical unit in parallel in grid-forming mode while providing overlaying control scheme by the central control unit. The inverters themselves may be spared of having to deal with certain parameters of the AC-load to be supplied; rather, the capacities of the central control unit may be utilized to adopt to potentially varying needs of the AC-load. Also, the inverters may not need to comprise hardware elements that would be needed for grid-forming operation only, but not for grid-following operation. This allows for using inverters originally designed for grid connected operation, i.e., for providing grid-following electrical power, which lack a choke being properly sized for load-sharing with other inverters being connected in parallel and operating in grid-forming mode autonomously. Instead, the necessary hardware for load-sharing is built into the electrical unit being common to the inverters. The electrical unit may at the same time serve to switch between grid connected mode, i.e. grid parallel mode, and intended islanding operation, i.e., grid-forming mode.

The inverters may supply connected loads together in grid-forming mode, e. g., intended islanding operation, off-grid or backup, with the possibility of sharing the load between the inverters. In a situation with multiple inverters supplying electrical power to loads together in grid-forming mode operation, the load may be shared between the inverters. This sharing may be balanced and adjusted very fast by the control loops of the respective inverters in order to cope with transient load behavior, e.g., due to switching on and off, as well as with power fluctuations of the sources feeding the inverters. Such sources might be DC-sources like DC-storages and/or PV-arrays.

The central control unit, on the other hand, may take care of rather long-term adjustments of the load balancing between the inverters connected to the electrical unit. The central control unit may communicate with the inverters, e. g. by interchanging control signals with the control units of the inverters. The central control unit may realize an overlaying control scheme over inverters operating in parallel in grid-forming mode to return a stationary status to nominal values for voltage and frequency while the system is loaded, and to synchronize voltage and frequency of the entire islanded system prior to connecting the system back to the grid. In an embodiment, the control signals may comprise parameters of the control loops of the respective inverters, e.g., to modify a slope or reference values of droop curves implemented in the inverters for use within the load-sharing mode. In another embodiment, the control signals may comprise PWM signals directly controlling the switches of the respective inverter bridge circuits.

Disclosed is a method for operating a backup system power. The backup power system comprises a first inverter, a second inverter, and an electrical unit, wherein the electrical unit comprises a first port connected to an AC-grid, a second port connected to an AC-load, a third port connected to an AC-side of a first inverter, a first choke arranged between the third port and the second port, a fourth port connected to an AC-side of a second inverter, and a second choke arranged between the fourth port and the second port. The method comprises, using a central control unit:
- monitoring electrical parameters of the AC-grid using the central control unit,
- operating the first inverter and the second inverter in a grid-following operation mode,
- detecting a failure of the AC-grid based on the monitored electrical parameters, in case of a failure of the AC-grid, disconnecting the backup power system from the AC-grid, and switching the operation mode of the first and second inverters to switch from the grid-following operation mode into a grid-forming operation mode.

In an embodiment of the method, the detection of a grid failure and the instruction of the inverters is performed by the central control unit of the backup power system, wherein the switching of the operation mode of the first and second inverters is performed using control signals communicated via a first and a second communication channel, the first and second communication channels being associated with the third and the fourth port, respectively.

In an embodiment the method further comprises communicating electrical parameters of the AC-grid and/or the AC-load from the central control unit to the inverters via the communication channels, wherein the electrical parameters may comprise voltage, frequency, and/or power factor.

In an embodiment the method further comprises communicating control parameters from the central control unit to the inverters via the communication channels, wherein the control parameters may comprise active power setpoints, reactive power setpoints, voltage reference values and/or frequency reference values.

In an embodiment of the method, the grid forming operation mode comprises a load-sharing mode wherein the inverters are operated autonomously based on droop characteristics curves, wherein the droop characteristics relate inverter output frequency to inverter output power and inverter output voltage to inverter output reactive power.

BRIEF DESCRIPTION OF THE DRAWINGS

The disclosure will be described in more detail with reference to the accompanying drawings, wherein.

DETAILED DESCRIPTION

Figure 1:
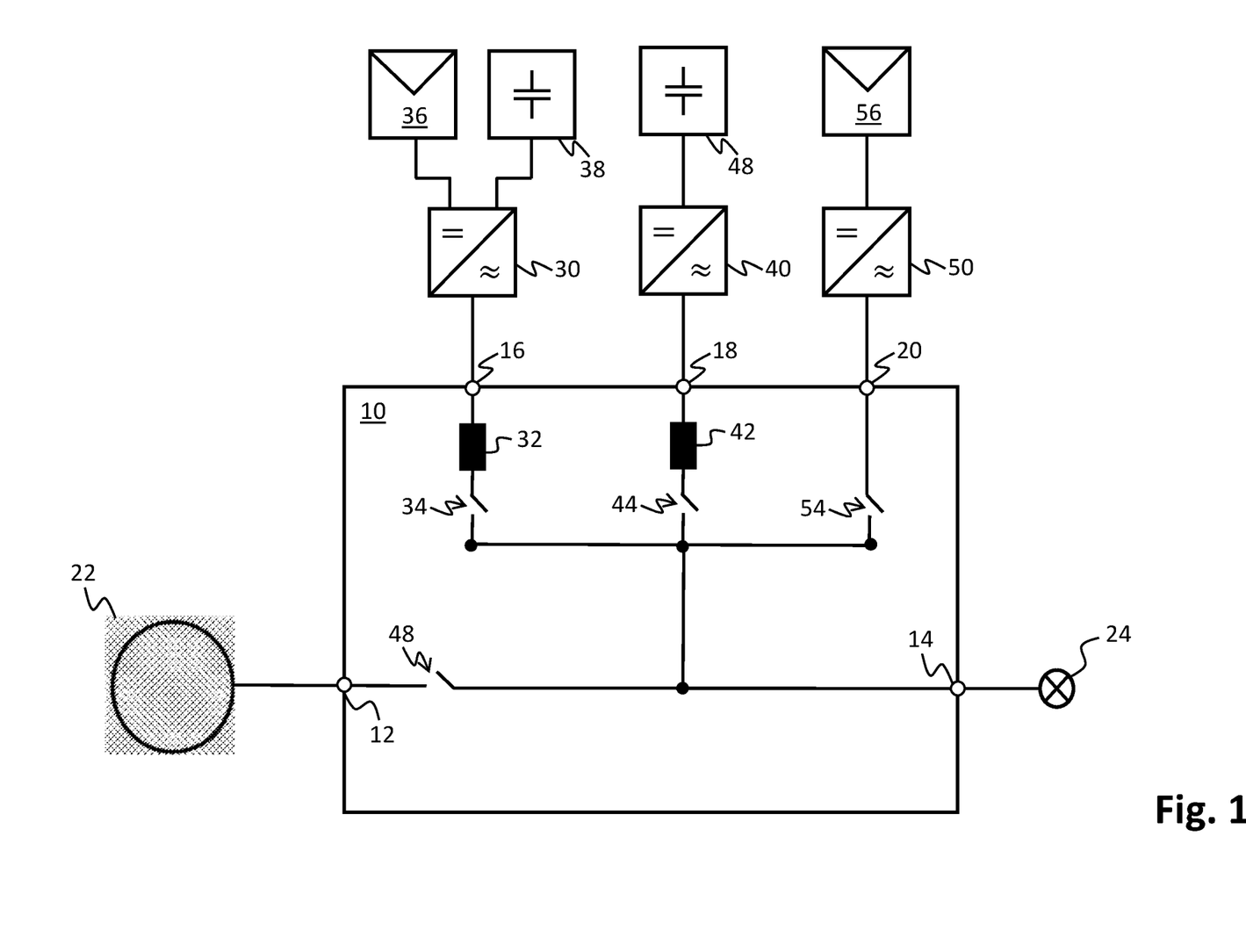
FIG. 1 schematically shows an embodiment of a backup power system with an electrical unit.

FIG. 1 shows an embodiment of a backup power system with an electrical unit 10, a first inverter 30, a second inverter 40, and a third inverter 50. The inverters 30, 40, 50 are configured to transfer power between their respective AC-side and their respective DC-side. The inverters 30, 40, 50 may comprise an inverter bridge with switching elements to realize the power transfer. The inverter bridge may comprise a single-phase, split-phase, or three-phase AC-output. The switching elements may be controlled by a respective control unit, e. g. firmware, of the inverters 30, 40, 50.

The DC-side of the first inverter 30 is operatively connected to a PV-array 36 and a battery 38. The PV-array 36 and the battery 38 are connected to the first inverter 30 via separate connectors and can be operated independently. The PV-array 36 and the battery 38 are sources of electrical power feeding the first inverter 30. The PV-array 36 and the battery 38 may be operated as sinks for electrical power provided on the DC-side of the first inverter 30 as well. The DC-side of the second inverter 40 is operatively connected to a battery 48. The battery 48 is a source of or a sink for electrical power feeding the second inverter 40 or provided by the second inverter 40, respectively. The DC-side of the third inverter 50 is operatively connected to a PV-array 56. The PV-array 56 is a source of electrical power feeding the third inverter 50.

A first port 12 of the electrical unit 10 is connected to an AC-grid 22. A second port 14 of the electrical unit 10 is connected to an AC-load 24 which is to be supplied with electrical power reliably, e.g., by providing grid-based electrical power when available and backup electrical power during an outage of the AC-grid 22. A first switch 48 is arranged between the first port 12 and the second port. The AC-grid 22 may be disconnected from and connected to the electrical unit 10 using this first switch 48.

The AC-side of the first inverter 30 is operatively connected to a third port 16 of the electrical unit 10. A first choke 32 is arranged in the electrical unit 10 between the third port 16 and the second port 14. A second switch 34 is arranged between the first choke 32 and the second port 14. The second switch 34 is also arranged between the first choke 32 and the first switch 48. The AC-side of the first inverter 30 may be effectively disconnected from both the AC-grid 22 and the AC-load 24 using the second switch 34.

The AC-side of the second inverter 40 is operatively connected to a fourth port 18 of the electrical unit 10. A second choke 42 is arranged between the fourth port 18 and the second port 14. A third switch 44 is arranged between the second choke 42 and the second port 14. The third switch 44 is also arranged between the second choke 42 and the first switch 48. The AC-side of the second inverter 40 may be effectively disconnected from both the AC-grid 22 and the AC-load 24 using the third switch 44.

The AC-side of the third inverter 50 is operatively connected to a fifth port 20 of the electrical unit 10. A fourth switch 54 is arranged between the fifth port 20 and the second port 14. The fourth switch 54 is also arranged between the fifth port 20 and the first switch 48. The AC-side of the third inverter 50 may be effectively disconnected from both the AC-grid 22 and the AC-load 24 using the fourth switch 54.

The first, second and third inverter 30, 40, 50 may be operated in a grid following manner, i.e., the inverters 30, 40, 50 may generate a current that basically follows the course of the voltage of the AC-grid 22. Therefor the inverters 30, 40, 50 are capable of supplying electrical power to the AC-load 24 in parallel with the AC-grid 22 and/or feeding electrical power into the AC-grid 22.

The first and second inverter 30, 40, when connected to the electrical unit 10, may be operated in a grid forming manner as well. By facilitating the chokes 32, 42, respectively, the inverters 30, 40 are capable of forming an islanded AC-microgrid and supplying power to the AC-load 24 over that islanded AC-microgrid. For example, in case the AC-grid 22 is not operating properly, the backup power system may operate in backup mode and generate an output voltage that is sufficient to form an electrical grid, a local AC-microgrid, in island operation. In such a backup mode, the first and second inverters 30, 40 operate in a grid forming manner and supply the load 24 with electrical power without taking power from the AC-grid 22. A first control unit of the first inverter 30 may control the grid forming power supplied by the first inverter 30 with a first control loop. The first control loop comprises the first inverter 30 and the first choke 32. A second control unit of the second inverter 40 may control the grid forming power supplied by the second inverter 40 with a second control loop. The second control loop comprises the second inverter 40 and the second choke 42. In the embodiment shown in FIG. 1, the third inverter 50 does not supply grid forming power, but may supply grid following power to the local, islanded grid formed by the grid forming first and second inverter.

Figure 2:
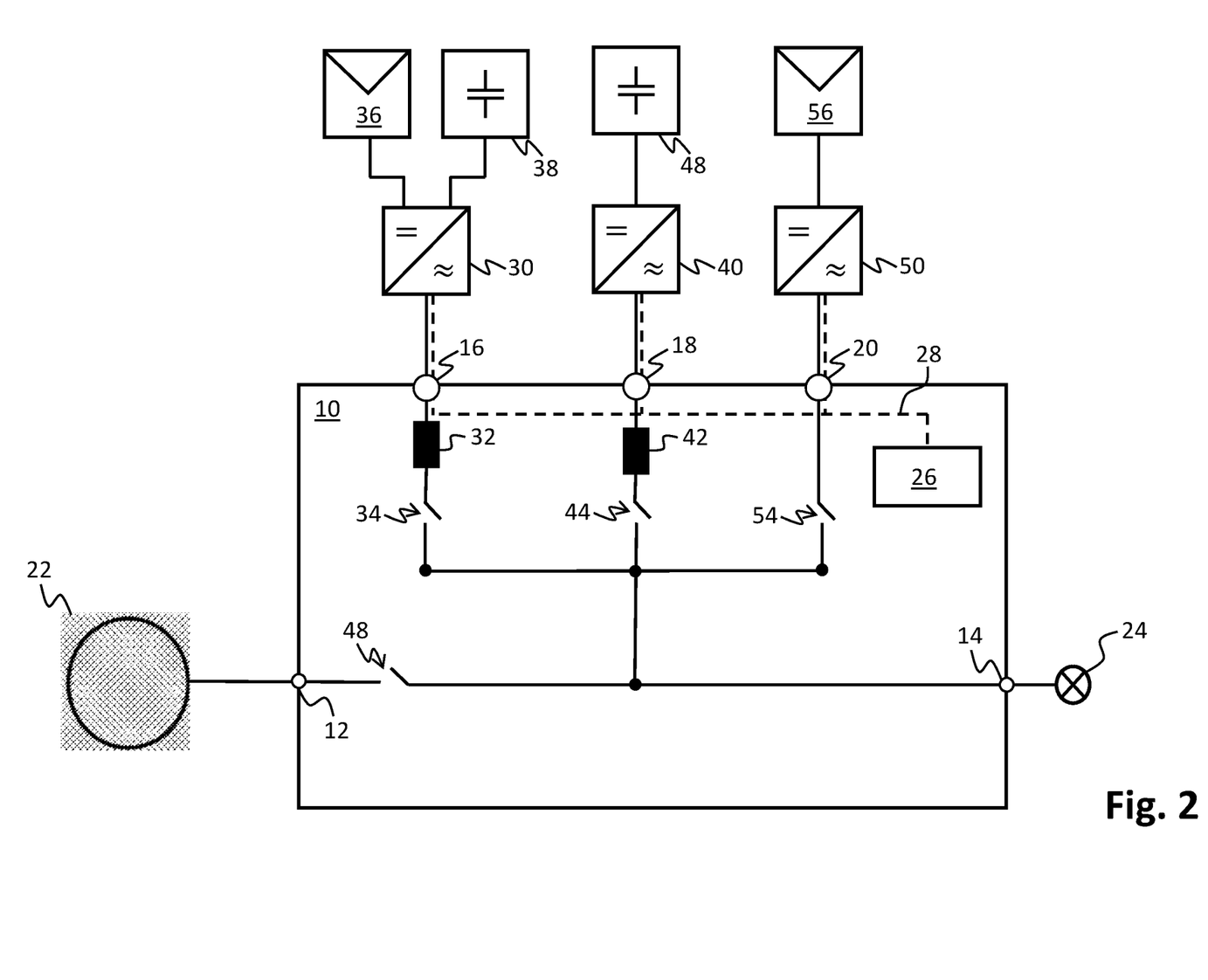
FIG. 2 schematically shows an embodiment of a backup power system with an electrical unit.

FIG. 2 shows another embodiment of the backup power system with another embodiment of the electrical unit 10. Elements of this embodiment with the same or a similar function as in the embodiment described in connection with FIG. 1 carry the same reference signs as in FIG. 1.

In the embodiment of FIG. 2, the backup power system comprises a central control unit 26 with a communication channel 28 configured to communicate control signals from the central control unit 26 to the first, second and third inverter 30, 40, 50.

The central control unit 26 may be comprised in the electrical unit 10. As an alternative not depicted here, the central control unit 26 may be a separate device or be integrated in one of the inverters 30, 40. The central control 26 unit may also be a distributed computing device with elements in one or more of the devices of the backup power system. The central control unit 26 may be configured to control the switches 48, 34, 44, 54.

The communication channel 28 between the inverters 30, 40 and the central control unit 26 may be associated with the third port 16 and the fourth port 18 of the electrical unit 10; respectively. In particular, the central control unit 26 may communicate control signals to the first inverter 30 and the second inverter 40 independently via dedicated communication channels, e.g., power line communication channels along the power lines connecting the electrical unit 10 with the respective inverter 30, 40, or alternatively via another wired or wireless channels. The common communication channel 28 comprising said dedicated communication channels may also extend to the third inverter 50.

The central control unit 26 may be configured to realize an overlaying control scheme, controlling parameters of the electrical power output at the second port 14, by setting parameters of the control loops involving the inverters 30, 40, 50 and the respective associated chokes 32, 42. The central control unit 26 may communicate with the first control unit and the second control unit of the first and second inverter 30, 40, respectively. Such communication may support stability of the stationary behavior of the backup power system. The time constants of such an overlaying control scheme may be less tight than those of the power control loop controlled by the first and second control unit of the individual inverters 30, 40. The clock time of such an overlaying control scheme may e. g. be in the range of some 100 milliseconds compared to the microseconds clocking of the inverter control loops.

The inverters 30, 40 may be operated in parallel to each other in grid forming mode. The central control unit 26 may provide an overlaying control. The chokes 32, 42 may be arranged within the electrical unit 10 and part of the inverter control loops, and at the same time be the overlaying control adjust parameters of the control loops. In particular, the electrical unit 10 may serve to switch between the grid connected mode, i.e., grid parallel operation mode of the inverters 30, 40, 50 eventually comprising output of grid-following electrical power, and intended islanding operation, i.e., grid forming operation mode of the first and second inverter 30, 40 comprising output of grid-forming electrical power. The electrical unit 10 may serve to switch on or off the third inverter 50 and to connect it to and disconnect it from the electrical unit 10 by operating the fourth switch 54.

Figure 3:
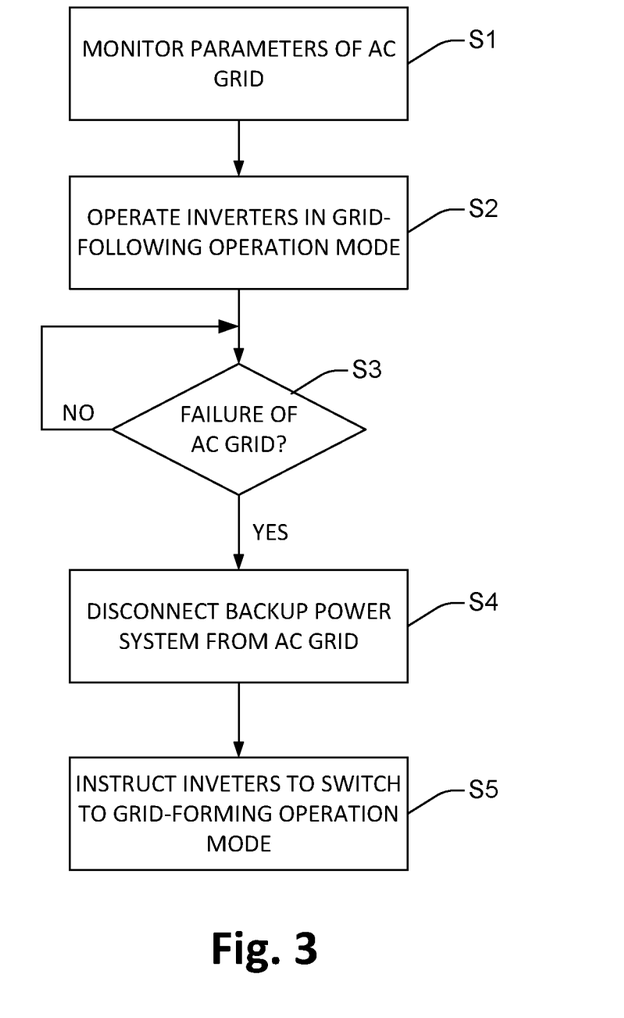
FIG. 3 schematically shows a method for operating a backup power system.

FIG. 3 shows an embodiment of a method for operating a backup power system. The method for operating a power backup system comprises: monitoring electrical parameters of the AC-grid 22 using the central control unit 26 at S1, and operating the inverters 30, 40, 50 in a grid following operation mode at S2. The method further comprises detecting a failure of the AC-grid 22 based on the electrical parameters at S3, and in case of a failure of the AC-grid 22, disconnecting the backup power system from the AC-grid 22, e. g. by using the first switch 48 at S4. Finally, the method comprises instructing the inverters 30, 40 to switch from the grid following operation mode into a grid forming operation mode at S5. Optionally, the third inverter 50 may be instructed to switch off at S5.

The method may for example be executed by the central control unit 26. For example, the detection of the failure of the AC-grid 22 and the instruction of the inverters 30, 40 may be performed by the central control unit 26 of the electrical unit 10 of the backup power system. The instruction of the first and second inverters 30, 40 may be performed using control signals via the communication channel 28. In case it is detected based on the electrical parameters that the AC-grid 22 is available again, the backup power system may be connected back to the AC-grid 22, and the first and second inverter 30, 40 may be instructed via control signals over the communication channel 28 to switch from the grid forming operation mode to the grid following mode. Optionally, the third inverter 50 may be instructed to switch on again. Prior to switching to grid following mode, the central control unit 26 may communicate control signals to the inverters 30, 40 still operating in grid forming mode such that voltage, frequency, and/or phase vector of the electrical power supplied to the AC-load 24 is synchronized with the respective parameters of the AC-grid 22 in order to ensure a smooth transition between islanded operation and grid-connected operation.

Any instruction of the third inverter 50, e. g. to switch off or on again, e. g. when the AC-grid 22 is back, may be performed using control signals via a dedicated communication channel comprised in the communication channel 28.

The electrical parameters of the AC-grid 22 and/or the AC-load 24 may be communicated from the central control unit 26 to the inverters 30, 40, 50, wherein the electrical parameters may optionally comprise voltage, frequency, power factor and the like, in particular, relating to the actual properties of the AC-load 24. The electrical parameters may be communicated using the control signals via the communication channel 28. Alternatively or additionally, control parameters may be communicated via the communication channel 28 from the central control unit 26 to the inverters 30, 40, 50, wherein the control parameters may optionally comprise active power setpoints, reactive power setpoints, voltage reference values, frequency reference values, or slopes of droop functions used in the inverters 30, 40 to generated a balanced supply of the AC-load 24 with electrical power from the inverters 30, 40, in particular during a grid failure.

The grid forming operation mode may comprise a load-sharing mode wherein the first and second inverter 30, 40 are operated autonomously to suitably share the power supply to the load 24. The load-sharing mode may be based on droop curves, wherein the droop curves relate inverter output frequency to inverter output power and inverter output voltage to inverter output reactive power. Such load-sharing yields a balanced power supply and is adjusted very fast by the control loops of the inverters 30, 40 in order to cope with transient load behavior, e.g., due to switching on and off, as well as power fluctuations of the sources feeding the inverters 30, 40. The central control unit 26 may take additional care of monitoring the load balancing and applying adjustments to the parameters of the individual control loops as needed. The inverters' control units may therefore be spared of this task.

The invention claimed is:

1. An electrical unit, comprising:
   a first port configured to be operatively connected to an AC-grid,
   a second port configured to be operatively connected to an AC-load, and
   a third port to be operatively connected to an AC-side of a first inverter,
   wherein the electrical unit comprises a first choke arranged between the third port and the second port,
   wherein the electrical unit is configured to transfer electrical power provided by the first inverter from the third port via the first choke to the second port,
   wherein the electrical unit is configured to selectively provide grid-based electrical power from the AC-grid to the AC-load via the first port and the second port, or grid-forming electrical power via the third port and the second port to the AC-load wherein a switch for disconnection from the AC-grid is arranged at the first port, and
   a fourth port configured to connect to an AC-side of a second inverter, wherein the electrical unit comprises a second choke arranged between the fourth port and the second port, wherein the electrical unit is configured to transfer electrical power provided by the second inverter from the fourth port via the second choke to the second port, wherein the first choke and the second choke are configured to decouple the third and fourth port, respectively, such that grid-forming electrical power provided by the first and second inverters is balanced when the first and second inverters are operated in grid-forming mode autonomously,
   wherein the first inverter is configured to transform electrical power between a DC-side of the first inverter and the AC-side of the first inverter, and wherein the second inverter is configured to transform electrical power between a DC-side of the second inverter and the AC-side of the second inverter.

2. The electrical unit according to claim 1, wherein the third port and/or the fourth port are further coupled to a central control unit associated with the electrical unit.

3. The electrical unit according to claim 2, wherein the electrical unit comprises the central control unit, which is configured to send control signals to the first and second inverters via the third port and the fourth port, respectively.

4. The electrical unit according to claim 1, further comprising a central control unit configured to determine a failure of the AC-grid and to disconnect the AC-load from the AC-grid in case of a failure of the AC-grid by opening the switch.

5. A backup power system, comprising:
   an electrical unit comprising
   a first port configured to be operatively connected to an AC-grid,
   a second port configured to be operatively connected to an AC-load, and
   a third port to be operatively connected to an AC-side of a first inverter,
   wherein the electrical unit comprises a first choke arranged between the third port and the second port,
   wherein the electrical unit is configured to transfer electrical power provided by the first inverter from the third port via the first choke to the second port,
   wherein the electrical unit is configured to selectively provide grid-based electrical power from the AC-grid to the AC-load via the first port and the second port, or grid-forming electrical power via the third port and the second port to the AC-load wherein a switch for disconnection from the AC-grid is arranged at the first port; and
   wherein the first inverter is configured to transform electrical power between a DC-side of the first inverter and the AC-side of the first inverter,
   and wherein the AC-side of the first inverter is operatively connected to the third port of the electrical unit;
   a fourth port configured to connect to an AC-side of a second inverter, wherein the electrical unit comprises a second choke arranged between the fourth port and the second port, wherein the electrical unit is configured to transfer electrical power provided by the second inverter from the fourth port via the second choke to the second port, wherein the first choke and the second choke are configured to decouple the third and fourth port, respectively, such that grid-forming electrical power provided by the first and second inverters is balanced when the first and second inverters are operated in grid-forming operation mode autonomously,
   wherein the second inverter is configured to transform electrical power between a DC-side of the second inverter and the AC-side of the second inverter, and wherein the AC-side of the second inverter is operatively connected to the fourth port of the electrical unit.

6. The backup power system according to claim 5, the first inverter comprising a first control unit, wherein the first control unit is configured to control a first control loop comprising the first inverter and the first choke to selectively provide grid-following electrical power via the first port to the AC-grid and via the second port to the AC-load, or provide grid-forming electrical power via the second port to the AC-load if the AC-grid is disconnected.

7. The backup power system according to claim 5, wherein the first choke and the second choke each have an inductance value which exceeds an inductance value of any inductance arranged at the AC-sides of the first inverter and the second inverter, respectively.

8. The backup power system according to claim 7, wherein the first choke and the second choke each have an inductance value which exceeds the inductance value of the any inductance arranged at the AC-sides of the first inverter and the second inverter, respectively, at least by a factor of two.

9. The backup power system according to claim 5, the first inverter comprising a first control unit, wherein the first control unit is configured to control a first control loop comprising the first inverter and the first choke, and the second inverter comprising a second control unit, wherein the second control unit is configured to control a second control loop comprising the second inverter and the second choke, wherein the first control unit and the second control unit are configured to individually control the respective first and second control loops to selectively provide grid-following electrical power if the AC-load is connected to the AC-grid, or grid-forming electrical power if the AC-grid is disconnected.

10. The backup power system according to claim 9, wherein the first control loop and the second control loop are configured to share the electrical power supplied to the AC-load when the first and second inverters operate in grid-forming mode in case of a disconnection of the AC-grid.

11. The backup power system according to claim 9, wherein the first control loop and the second control loop are configured according to a self-sync method comprising droop characteristics for inverter output frequency as a function of inverter output power and for inverter output voltage as a function of inverter output reactive power.

12. The backup power system according to claim 9, wherein the backup power system comprises a central control unit configured to send control signals to the first inverter and the second inverter.

13. The backup power system according to claim 12, wherein the central control unit is configured to determine a failure of the AC-grid and to disconnect the electrical unit from the AC-grid in case of a failure of the AC-grid by opening the switch.

14. The backup power system according to claim 12, wherein the central control unit is configured to switch the first and second control loops of the first inverter and the second inverter between a grid-following operation mode and the grid-forming operation mode based on a determination of whether the AC-grid is available or a determination of whether there is a failure of the AC-grid, respectively.

15. A method for operating a backup power system, the backup power system comprising a first inverter, a second inverter, and an electrical unit, wherein the electrical unit comprises a first port configured to be connected to an AC-grid, a second port configured to be connected to an AC-load, a third port connected to an AC-side of the first inverter, a first choke arranged between the third port and the second port, a fourth port connected to an AC-side of the second inverter, and a second choke arranged between the fourth port and the second port, wherein the method comprises:

monitoring electrical parameters of the AC-grid, operating the first and second inverters in a grid-following operation mode,     selectively detecting a failure of the AC-grid based on the monitored electrical parameters,     in case of a failure of the AC-grid, disconnecting the backup power system from the AC-grid, and     upon disconnecting the backup power system from the AC-grid, switching an operation mode of the first and second inverters from the grid-following operation mode to a grid-forming operation mode, wherein the grid-forming operation mode comprises employing the first choke and the second choke to decouple the third port and the fourth port, respectively, to balance a grid-forming electrical power when the first inverter and the second inverter are operated autonomously in the grid-forming operation mode.

16. The method according to claim 15, wherein the backup power system further comprises a central control unit, wherein a detection of a grid failure and an instruction of the inverters is performed by the central control unit of the backup power system, wherein the switching of the operation mode of the first and second inverters is instructed by the central control unit using control signals communicated via a first communication channel and a second communication channel being associated with the third port and the fourth port, respectively.

17. The method according to claim 16, further comprising communicating electrical parameters of the AC-grid and/or the AC-load from the central control unit to the first and second inverters via the first and second communication channels, respectively, wherein the electrical parameters comprise voltage, frequency, and/or power factor.

18. The method according to claim 15, wherein the grid-forming operation mode comprises a load-sharing mode wherein the first and second inverters are operated autonomously based on droop characteristics, wherein droop characteristics relate inverter output frequency to inverter output power and inverter output voltage to inverter output reactive power.

\* \* \* \* \*